US009900182B2

(12) United States Patent
Fausak et al.

(10) Patent No.: US 9,900,182 B2
(45) Date of Patent: *Feb. 20, 2018

(54) CLIENT SIDE REDIRECTION WITH PLUGGABLE AUTHENTICATION AND AUTHORIZATION

(71) Applicant: Dell Products L.P., Round Rock, TX (US)

(72) Inventors: Andrew T. Fausak, San Jose, CA (US); Oleg Rombakh, Los Gatos, CA (US)

(73) Assignee: Dell Products L.P., Round Rock, TX (US)

(*) Notice: Subject to any disclaimer, the term of this patent is extended or adjusted under 35 U.S.C. 154(b) by 64 days.

This patent is subject to a terminal disclaimer.

(21) Appl. No.: 14/742,148

(22) Filed: Jun. 17, 2015

(65) Prior Publication Data

US 2016/0234216 A1    Aug. 11, 2016

Related U.S. Application Data

(60) Provisional application No. 62/115,047, filed on Feb. 11, 2015.

(51) Int. Cl.
*H04L 12/46* (2006.01)
*H04L 29/08* (2006.01)
(Continued)

(52) U.S. Cl.
CPC ........ *H04L 12/4679* (2013.01); *H04L 9/3213* (2013.01); *H04L 12/4641* (2013.01);
(Continued)

(58) Field of Classification Search
CPC . H04L 12/4679; H04L 12/4641; H04L 69/04; H04L 67/38; H04L 69/14;
(Continued)

(56) References Cited

U.S. PATENT DOCUMENTS 7,089,584 B1    8/2006  Sharma
7,467,217 B2   12/2008  Fausak .......................... 703/230
(Continued)

FOREIGN PATENT DOCUMENTS

EP           1041496        10/2000

OTHER PUBLICATIONS

U.S. Appl. No. 14/742,239; 75 pages, dated Jun. 17, 2015.
(Continued)

*Primary Examiner* — Hadi Armouche
*Assistant Examiner* — Cheng-Feng Huang
(74) *Attorney, Agent, or Firm* — Baker Botts L.L.P.

(57) ABSTRACT

A system and method of client side redirection with pluggable authentication and authorization is disclosed. In a particular embodiment, an operating system of a first computing device receives a request to cause remote desktop protocol (RDP) client device to connect to a second computing device. The client is coupled to the first computing device via a first RDP connection. The first computing device may use information associated with the first RDP connection to qualify the client to connect to the second computing device. If qualified, first computing device may send a redirect instruction to the client that redirects the client from the first computing device to the second computing device. The first computing device may send credentials to the client for use in establishing a second RDP connection to the second computing device. The redirect instruction and credentials may be sent via a virtual channel of the first RDP connection.

13 Claims, 12 Drawing Sheets

(51) Int. Cl.
*H04L 9/32* (2006.01)
*H04L 29/06* (2006.01)

(52) U.S. Cl.
CPC ...... *H04L 63/0272* (2013.01); *H04L 63/0807* (2013.01); *H04L 63/10* (2013.01); *H04L 63/102* (2013.01); *H04L 67/025* (2013.01); *H04L 67/08* (2013.01); *H04L 67/1002* (2013.01); *H04L 67/141* (2013.01); *H04L 67/142* (2013.01); *H04L 67/148* (2013.01); *H04L 67/2814* (2013.01); *H04L 67/38* (2013.01); *H04L 67/42* (2013.01); *H04L 69/04* (2013.01); *H04L 69/14* (2013.01); *H04L 63/08* (2013.01); *Y02B 60/33* (2013.01)

(58) Field of Classification Search
CPC ... H04L 63/0272; H04L 67/08; H04L 67/142; H04L 63/0807; H04L 67/148; H04L 63/10; H04L 67/1002; H04L 9/3213; H04L 67/42
See application file for complete search history.

(56) References Cited

U.S. PATENT DOCUMENTS

| | | |
|---|---|---|
| 7,712,137 B2 | 5/2010 | Meier |
| 8,316,237 B1 | 11/2012 | Felsher |
| 8,392,969 B1 | 3/2013 | Park |
| 8,418,233 B1 | 4/2013 | Hughes |
| 8,607,054 B2 | 12/2013 | Ramarathinam |
| 8,892,453 B2 | 11/2014 | Nakamura |
| 8,976,384 B1 | 3/2015 | Marquardt |
| 9,098,972 B2 | 8/2015 | Shimabukuro |
| 9,225,799 B1 | 12/2015 | Dong |
| 2002/0094090 A1 | 7/2002 | Lino |
| 2003/0079042 A1 | 4/2003 | Yamanaka |
| 2004/0073792 A1 | 4/2004 | Noble |
| 2004/0143746 A1 | 7/2004 | Ligeti |
| 2005/0192099 A1 | 9/2005 | Nguyen |
| 2006/0265436 A1 | 11/2006 | Edmond |
| 2006/0266832 A1 | 11/2006 | Howarth |
| 2007/0204166 A1 | 8/2007 | Tome |
| 2007/0282951 A1* | 12/2007 | Selimis ............ H04L 67/06 709/205 |
| 2009/0144469 A1 | 6/2009 | Brundridge |
| 2009/0150550 A1 | 6/2009 | Barreto |
| 2009/0183225 A1 | 7/2009 | Malakapalli |
| 2009/0210456 A1 | 8/2009 | Subramaniam |
| 2010/0246602 A1* | 9/2010 | Barreto ............ H04L 49/90 370/466 |
| 2010/0250770 A1* | 9/2010 | Barreto ............ H04L 49/90 709/231 |
| 2011/0126110 A1 | 5/2011 | Vilke |
| 2011/0153716 A1* | 6/2011 | Malakapalli ........ G06F 9/4445 709/203 |
| 2011/0153838 A1 | 6/2011 | Belkine |
| 2011/0276699 A1 | 11/2011 | Pedersen |
| 2012/0021721 A1 | 1/2012 | Reed |
| 2012/0029691 A1 | 2/2012 | Mockus |
| 2012/0096271 A1* | 4/2012 | Ramarathinam ... H04L 63/0807 713/172 |
| 2012/0191980 A1* | 7/2012 | Kennedy ............ G06F 21/6236 713/183 |
| 2012/0246476 A1 | 9/2012 | Zhuang et al. |
| 2012/0297026 A1 | 11/2012 | Polis |
| 2013/0091239 A1 | 4/2013 | Hao |
| 2013/0298104 A1 | 11/2013 | Kletsky |
| 2014/0082715 A1 | 3/2014 | Grajek |
| 2014/0304418 A1 | 10/2014 | Torok |
| 2016/0036908 A1 | 2/2016 | Aggarwal |
| 2016/0234040 A1 | 8/2016 | Fausak |
| 2016/0234195 A1 | 8/2016 | Fausak |
| 2016/0234196 A1 | 8/2016 | Fausak |
| 2016/0234286 A1 | 8/2016 | Fausak |
| 2016/0234343 A1 | 8/2016 | Fausak |

OTHER PUBLICATIONS

U.S. Appl. No. 14/742,191; 50 pages, dated Jun. 17, 2015.
U.S. Appl. No. 14/742,124; 52 pages, dated Jun. 17, 2015.
U.S. Appl. No. 14/742,092; 68 pages, dated Jun. 17, 2015.
Hoffman, "How to Forward Ports to a Virtual Machine and Use It as a Server", Aug. 26, 2012, www.howtogeek.com, 5 pages.

* cited by examiner

402 By an operating system (OS) of a first computing device, receiving a request to cause a remote desktop protocol (RDP) client device to connect to a second computing device, the RDP client device being coupled to the first computing device via a first RDP connection

404 By the OS of the first computing device, qualifying the RDP client device to connect to the second computing device

406 By the OS of the first computing device, if the RDP client device is qualified to connect to the second computing device, then sending to the RDP client device: an instruction for the RDP client device to be re-directed from the first computing device to the second computing device and one or more credentials for the RDP client device to establish a second RDP connection to the second computing device

*FIG. 4D*

CLIENT SIDE REDIRECTION WITH PLUGGABLE AUTHENTICATION AND AUTHORIZATION

RELATED APPLICATION

This application claims the benefit, under 35 U.S.C. § 119(e), of U.S. Provisional Patent Application No. 62/115,047, filed 11 Feb. 2015, which is incorporated herein by reference.

TECHNICAL FIELD

This disclosure relates generally to information handling systems and, more particularly, to enabling client side redirection.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which:

FIG. 4D illustrates an exemplary method for client-side redirection from the point of view of the server.

DETAILED DESCRIPTION

Figure 1:
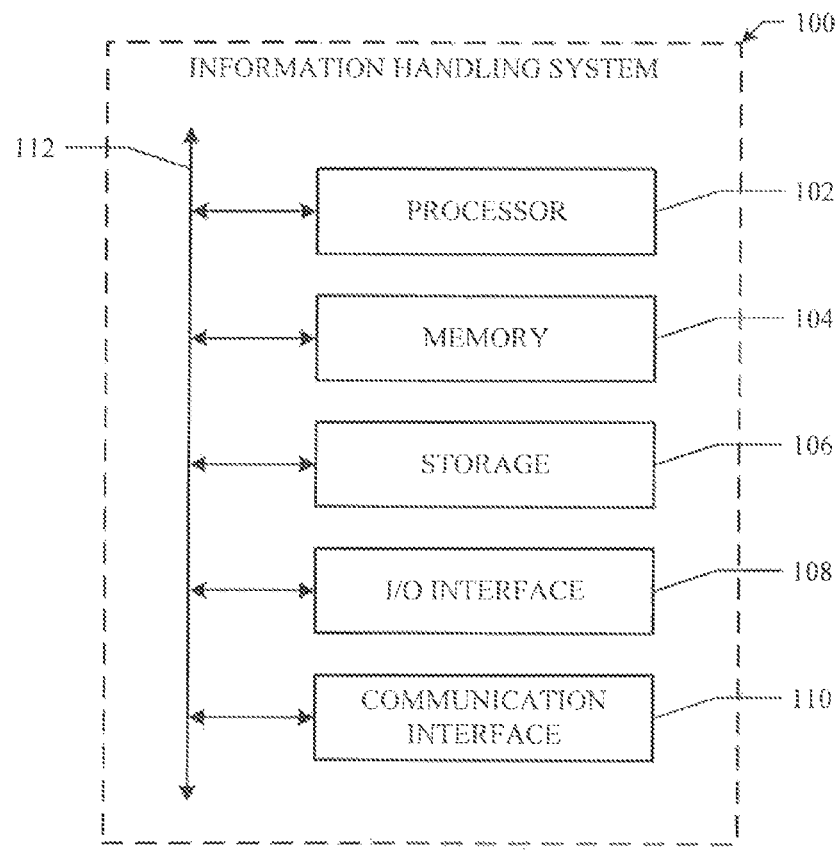
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
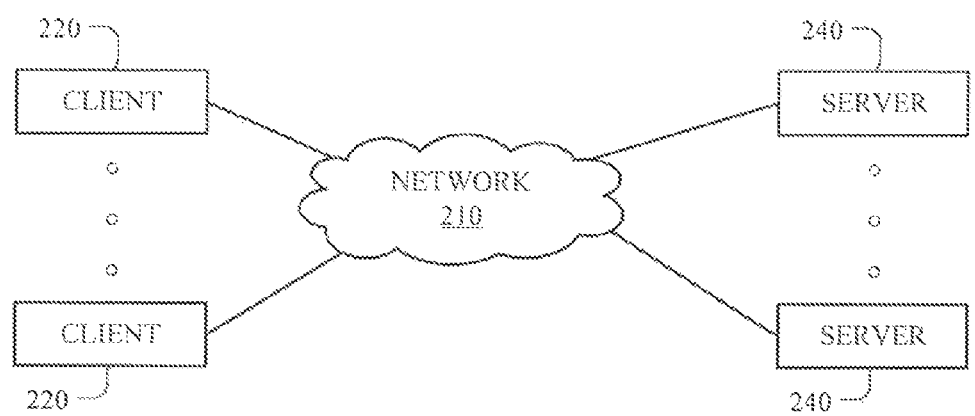
FIG. 2 depicts an exemplary network environment.

Particular embodiments are best understood by reference to FIGS. 1-2, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling system (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client device 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (e.g. a thin client) may be designed with minimal or limited storage capacity (e.g. in a hard disk). The client device may be required, however, to run an operating system such as WINDOWS EMBEDDED or WINDOWS SERVER, but the footprint of the operating system may grow over time with newer releases or updates. Hence, client devices may, over time, begin to run low on free storage space (e.g. in the hard disk). Unwanted files may be deleted or full volume compression of the storage medium (e.g. the hard disk) may be implemented to increase available storage space. However, full volume compression may introduce performance shortcomings (e.g. increased number of instruction cycles required to compress/uncompress data in the volume) from the point of view of an end user of the client device. In particular embodiments, optimized volume compression may be implemented to reduce effective disk usage on a client device while minimizing impact on system performance.

In particular embodiments, servers 240 may operate in one or more private networks that are incompatible with network 210. In particular embodiments, network 210 may be an untrusted network to servers 240 operating behind one or more firewalls. In particular embodiments, client devices 220 may utilize data encryption for transporting unencrypted data traffic over one or more encrypted tunnels that bypass the firewalls. As an example and not by way of limitation, client device 220 may set up an encrypted secure shell (SSH) tunnel to a targeted server 240 in order to access network service provided by the targeted server 240. In particular embodiments, client device 220 may be configured to forward a pre-determined local port to a port on the targeted server 240. Once the encrypted SSH tunnel has been established, client device 220 may connect to the pre-determined local port to access the network service of the targeted server 240. Accordingly, the encrypted SSH tunnel may provide security to unencrypted data traffic associated with the network service. In particular embodiment, client devices 220 may communicate with servers 240 via a proxy server. As an example and not by way of limitation, one of servers 240 behind the firewalls may be the proxy server (gws) (e.g. HTTP proxy) such that client device 220 may connect to the proxy server in order to access network service of another server 240 that is coupled to the proxy server. In particular embodiments, client device 220 may utilize transport gateway client (gwc) to issue a request (e.g. HTTP CONNECT method) for connecting to the transport gateway server (gws 300) or proxy server. Thereafter, the proxy server may tunnel (or proxy) a transmission control protocol (TCP) based connection to that server 240 and relay data traffic between that server 240 and client device 220.

Figure 3A:
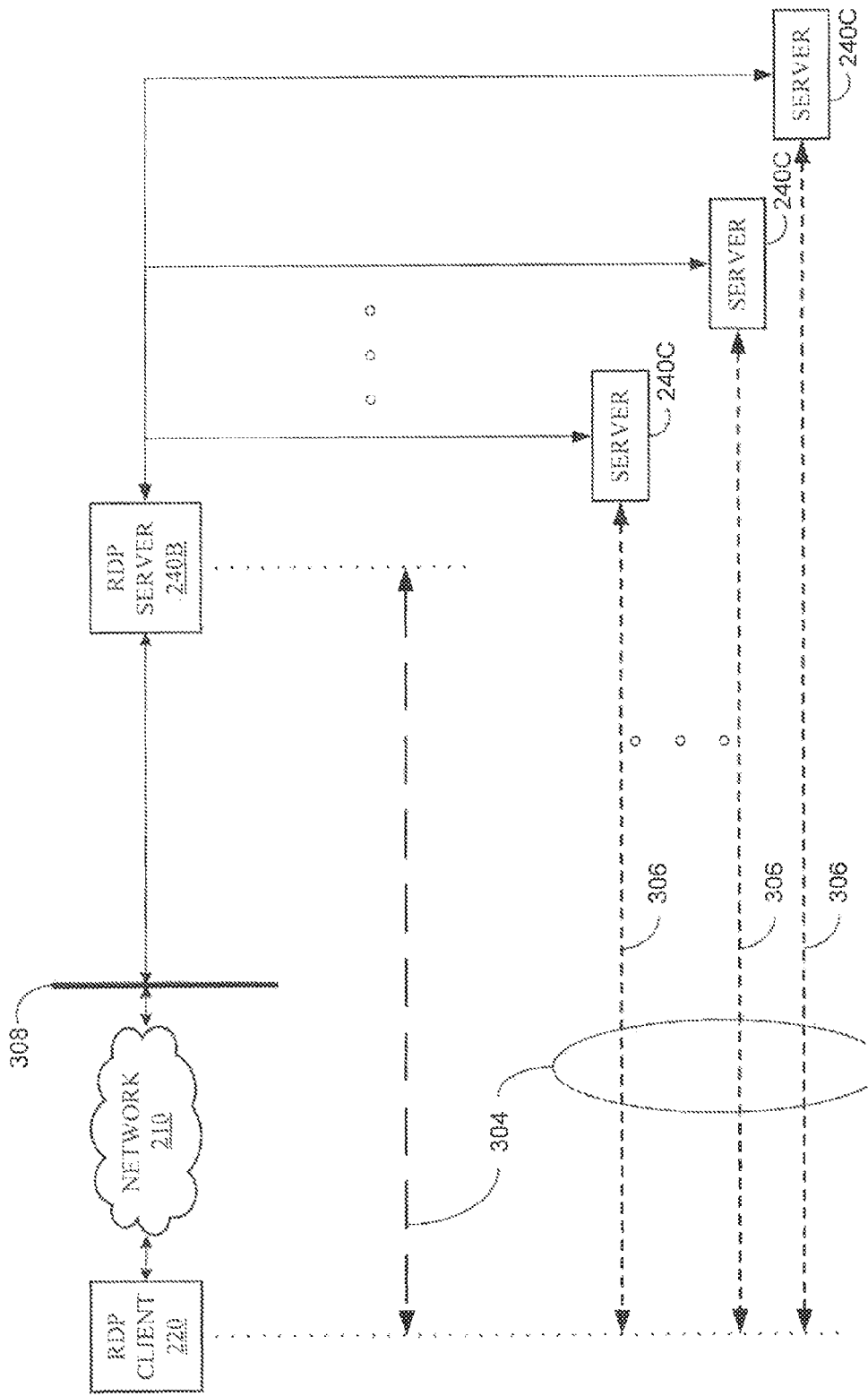
FIG. 3A is an example of a network environment utilizing RDP.

FIG. 3A illustrates a network environment utilizing an application that has virtual channels, which is a means to provide data pathway using a provision of an existing protocol. As an example and not by way of limitation, such an application may be a Remote Desktop Protocol Client (RDPc). In particular embodiments, RDPc 220 may be a personal computer, a laptop computer, a thin client, a mobile device, or any other information handling system with an RDP client protocol implementation. In particular embodiments, RDPc 220 may be associated with one or more sites (e.g. subnets) of network 210. In particular embodiments, communication to servers 240 may occur through one or more trusted and secure private networks. As an example and not by way of limitation, the trusted and secure private networks may be associated with one or more enterprise networks. In particular embodiments, RDP client device 220 of network 210 may not be secure or trusted. For example, RDP client device may be a customer's device, a website visitor's device, or an employee's device (such as in a "bring your own device" environment). As an example and not by way of limitation, network 210 may comprise a public network, such as the Internet, or a third-party network. Network 210 may be untrusted, for example the network may have substantially low security. In order to protect servers 240 against potential security threats from network 210 and RDP client device 220, a firewall 308 may establish one or more barriers that screen incoming and outgoing data traffic between servers 240 and RDP client device 220. In particular embodiments, firewall 308 may comprise one or more of a software-based network security system or a hardware-based network security system that screen the data traffic according to one or more pre-determined routing rule-sets. In particular embodiments, firewall 308 may comprise one or more network security systems developed by Microsoft Corporation. Furthermore, servers 240 may be deployed using Microsoft Enterprise servers. Herein, reference to the network security systems developed by Microsoft Corporation includes, but is not limited to, Microsoft Enterprise-based firewalls.

In particular embodiments, RDP server 240B may be a Microsoft Windows server providing Remote Desktop Services. In particular embodiments, RDP server (RDPs) 240B may comprise a device manager that manages RDP client device 220, as described above. In particular embodiments, servers 240C may include one or more services that a client-side operation may desire to connect to, or other servers that provide services to be accessed by a client, such as RDP Client 220, applications co-located with RDP Client 220, a port-forward within RDP Client 220, or virtual network through RDP Client 220. For example, servers 240C may comprise Microsoft Windows servers, Microsoft Enterprise servers, UNIX/LINUX servers, etc. Examples of services provided by servers 240C include, but are not limited to, file sharing, video streaming, audio streaming, database access, instant messaging, telephony, or video conferencing.

Figure 3B:
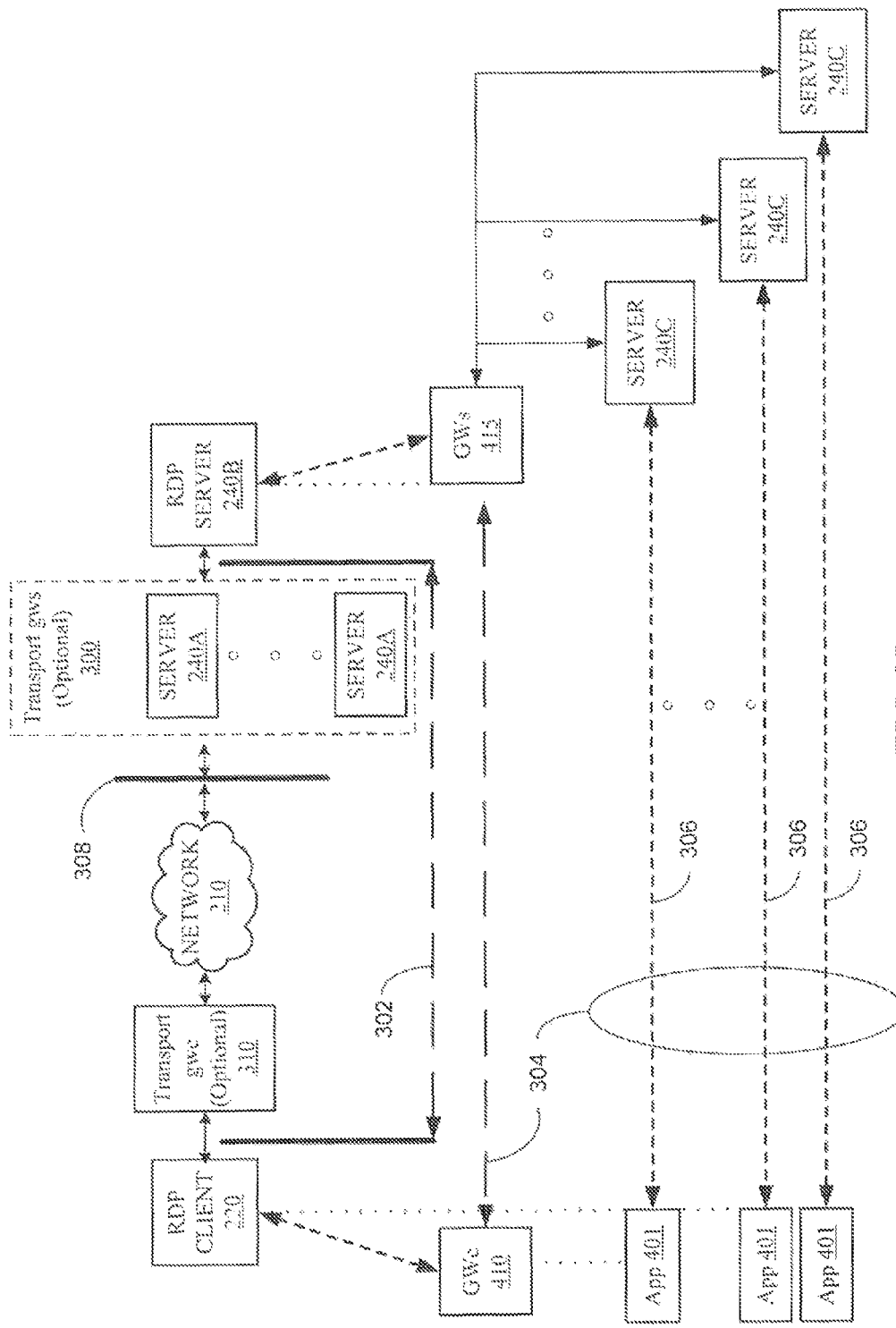
FIG. 3B is an example of a network environment utilizing RDP

In the example network environment of FIG. 3B, one or more RDP virtual channel is used to create a virtual private network between RDP client device 220 and one or more servers 240C, by attaching gateway functions (GWc//GWs) to each end of the RDP virtual channels. In a particular embodiment, firewall 308 is configured to permit an inbound RDP connection from RDP client 220 to RDP server (RDPs) 240B. After establishing the RDP connection (RDPc//RDPs) 302, RDP client 220 may create one or more RDP virtual channels 304 over the established RDP connection. For example, a user may desire to play an audio stream provided by a server 240C using an audio player application concurrently running on RDP client device 220. To provide access to the remote audio stream, Gateway client (GWc) 410 located within RDP client device 220 may establish a tunnel and channel using specialized Gateway service (GWs) attachment through RDP virtual channel connection 304 to RDP server 240B and again through specialized GWs 415 terminating the RDPs virtual channel. RDP server 240B may be configured to permit such a request to specialized GWs functionality on the RDPs. GWs 415 attached to RDP virtual channel 240B may provide access to the stream hosted by server 240C using any acceptable means, such as port forwarding. For example, in response to a request from GWc connected to virtual channel within RDP client 220, RDP server 240B may enable a configured port forward from RDPc 220 to RDP server 240B such that packets received from the RDP virtual channel 304 are encoded and forwarded in such a manner that the server through GWs routes appropriately to 240C the machine that hosts the audio stream. Specialized GWs connected to virtual channel linked to RDP server 240B's virtual channel to GWc may also configure a port forward such that packets received from server 240C are forwarded over the RDP virtual channel and routed to player application on RDPc host device. Similarly, GWc attached through RDP client 220 may use port forwarding to give an audio player running concurrently with the RDP client on RDP client device 220 access to the audio stream. For example, a local port may be configured to forward packets received from the audio player to server 240C over the RDP virtual channel, with all sourcing, sinking and routing determined by GWc and GWs attachments at alternate ends of the virtual channel. In this fashion, the RDP client 220 may also forward packets received from server 240C over the RDP virtual channel back to the local port to the audio player (again through GWc//GWs tunnel protocol).

In another particular embodiment, a transport gateway may be used to provide access to a remote service. For example, an application running on RDP client 220 may require access to a service provided by server 240C. A gateway client (gwc) may be provided on RDP client 220. A corresponding gateway server (gws) may be provided network access of RDP server 240B, the server 240C providing the target service, or on a different server 240C. RDP client device 220 may request an RDP virtual channel 304 on the established RDP connection 302 to RDP server 240B. On the RDP client device 220, the gateway client (GWc) 410 and Gateway service (GWs) 415 are bound to the RDP virtual channel 304. On RDP server 240B, the RDP virtual channel 304 is bound to the gateway server 415. The application is then able to communicate with the remote service through the connection pathway. The connection pathway utilizing virtual channel through RDP connection may be denoted as GWc/RDPc//RDPs/GWs when a transport gateway is also utilized, the connection pathway may be described as GWc/RDPc/gwc//gws/RDPs/GWs when the transport gateway is utilized. "I" is used to denote a local binding, and "II" is used to denote a remote binding.

In other particular embodiments, only a gateway client or a gateway server may be provided. For example, an application on RDP client device 220 may not require a separate transport gateway client to access a transport gateway server. In such an embodiment, the application connects directly to the transport gateway server. Other particular embodiments are described with reference to FIG. 3B. RDP client device 220 may connect to RDP server 240B via firewall 308 and transport gateway (gws) 300. In particular embodiments, gateway 300 may comprise one or more of a proxy server (e.g. web proxy) or a connection manager. The proxy server or connection manager may be operated by one or more servers 240A. The proxy server may act as an intermediary for data transfer between RDP client device 220 and RDP server 240B.

In particular embodiments, gateway 300 may utilize Microsoft's Tunneling Service to allow RDP client device 220 to establish a tunnel to servers 240B or 240C (e.g. Microsoft Enterprise servers) via firewall 308 (e.g. Microsoft Enterprise-based firewall). Microsoft's Tunneling Service is an HTTPS-based tunneling service role that supports tunneling RDP connections. As an example and not by way of limitation, transport gateway (gws) 300 by use of client-side transport gateway (gwc) may encode the RDP data packets, serialized for transmission over HTTPS, received from RDP client 220 and translate the data packets into native RDP data packets (also known as RDP protocol data units) for use by RDP server 240B. In the example network environment of FIG. 3, gateway 300 may consist of one or more servers 240A. In particular embodiments, RDP server 240B may be a RDP session host such that RDP client device 220 may connect to the RDP server 240B. After establishing the RDP connection 302, RDP client 220 may create one or more RDP virtual channels 304 over the established RDP connection and attach specialized Gateway protocol to each end of the virtual channel (GWc//GWs) 410/415 and open connection 306 to specified server. For example, a user may desire to play an audio stream provided by a server 240C using SMBs on server and using an audio player application concurrently running on RDP client device 220. To provide access to the remote audio stream, RDP client 220 may request a RDP virtual channel 304 on the established connection 302 to RDP server 240B. RDP server 240B may be configured to permit such a request through GWc and GWs at each end of virtual channel. RDP server 240B may provide access to the stream hosted by server 240C through GWc 410 and GWs 415 using any acceptable means, such as port forwarding. For example, in response to a request from RDP client 220, RDP server 240B may configure a port forward from RDP Client Host 220 to RDP server 240B such that packets received from the RDP virtual channel's Gateway 306 are forwarded from 220 to the server 240C that hosts the audio stream. RDP server 240B may also configure a port forward such that packets received from server 240C are forwarded over the RDP virtual channel through the GWc//GWs definitions to enable complete communication. Similarly, RDP client 220 may use port forwarding to give an audio player running concurrently with the RDP client on RDP client device 220 access to the audio stream. For example, a local port may be configured to forward packets received from the audio player to server 240C over the RDP virtual channel's GWc//GWs attachments. The RDP client 220 may also forward packets received from server 240C over the RDP virtual channel gateway to the local port to the audio player. The connection pathway may be denoted AudioPlayer(smbClient):GWc/RDPc//RDPs/GWs: smbHost or AudioPlayer (smbClient):GWc/RDPc/gwc/gws/RDPs/GWs:smbHost where gwc 310 has corresponding connection to transport gws 300. In particular embodiments, the RDP gateway client is integrated with the RDP client software.

In another particular embodiment, a gateway may be used to provide access to a remote service. For example, an application running on RDP client 220 may require access to a service provided by server 240C. A gateway client (gwc 310) may be provided on RDP client 220. A corresponding gateway server may be provided on RDP server 240B (gws 300), the server 240C providing the target service, or on a different server 240C. After RDPc and RDPs are connected, RDP client device 220 may request an RDP virtual channel 304 on the established RDP connection 302 to RDP server 240B with corresponding tunnel channel through GWc// GWs pair at each end of virtual channel 304. On the RDP client device 220, the gateway client is bound to the RDP virtual channel 304. On RDP server 240B, the RDP virtual channel 304 is transparently attached through gws (300). The application is then able to communicate with the remote service through the connection pathway. The connection pathway may be denoted as GWc/RDPc/gwc//gws/RDPs when the gateway server is provided beyond firewall 308 within scope of RDP server 240B. The connection pathway may be denoted as GWc/RDPc/gwc//gws/RDPs/GWs where GWc and GWs are virtual channel attachments and gws may reside on a server other than RDP server 240B. In other particular embodiments, only a gateway client or a gateway server may be provided. For example, an application on RDP client device 220 may not require a separate gwc to access a gws. In such an embodiment, the application connects directly from RDPc to RDPs to establish a connection gateway through virtual channel using GWc and GWs.

In other particular embodiments, an Independent Computing Architecture (ICA) protocol supporting virtual channels may be used in place of the Remote Desktop Protocol. In such an embodiment, an ICA Client may be used in place of RDP Client 220, and an ICA Server may be used in place of RDP Server 240B. In other particular embodiments, HTTP may be used with a CONNECT method in similar fashion to virtual channels in RDP.

Figure 4A:
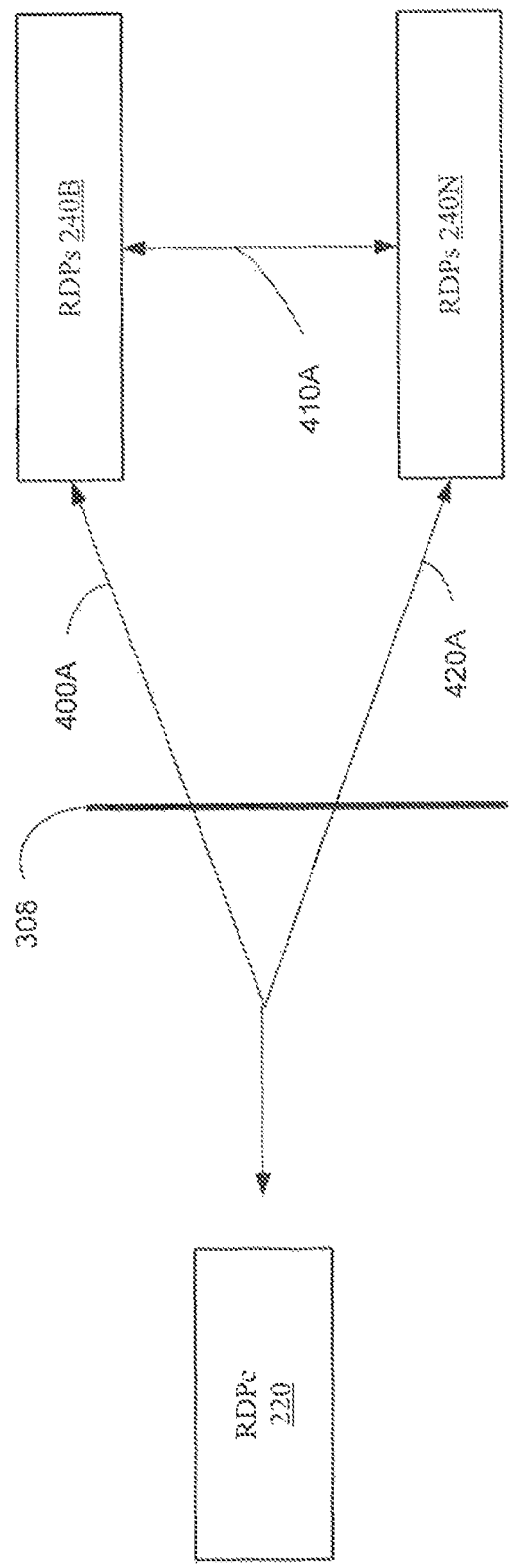
FIG. 4A illustrates an example of a server-side redirection.

FIG. 4A illustrates an example of server-side redirection within a network environment. Generally, server-side redirection may refer to a means of causing redirection prior to a connection being established. In particular embodiments, server-side redirection may occur within a network environment, including but not limited to, RDPc 220, one or more RDPs 240N, and firewall 308. One of ordinary skill in the art would realize server-side redirection is not limited to RDP clients and servers, but may be used between any type of client device and server.

In particular embodiments, a server-side redirection may occur when RDPc 220 attempts to open connection 400A with RDPs 240B, but RDPs 240B is either discontinued, currently down for maintenance, or any other reason known in the art that may require a server-side redirect. In particular embodiments, RDPs 240B may open connection 400A with RDPc 220, however even though a connection 400A may be open, no authentication between RDPc 220 and RDPc 240B has occurred. For example, a user, from one device, may attempt to login to another device over a network connection through a RDP. The user attempts to access the other device through a RDP server, however before being presented login information to authenticate the user, the RDP server (being discontinued, down for maintenance, etc.) may cause the client to be redirected to a different RDP server. That is, upon opening connection 400A, RDPs 240B opens connection 410A with a secondary host, RDPs 240N, to qualify RDPc 220.

In particular embodiments, after RDPs 240B connects to a secondary host, RDPs 240N, to qualify RDPc 220, RDPs 240B then receives information that RDPc 220 must connect to a different RDPs 240N. In particular embodiments, RDPs 240N may then communicate to RDPs 240B, over connection 410A, that RDPs 240N is able and willing to allow RDPc 220 to connect to RDPs 240N. At which point, RDPs 240B communicates through connection 400A that RDPc 220 should and may connect to RDPs 240N, wherein RDPs 240B passes along any relevant information needed for RDPc to form connection 420A with RDPs 240N.

In further embodiments, upon RDPc 220 receiving the communication (with relevant connection information) from RDPs 240B to connect to RDPs 240N, RDPc 220 may tear down connection 400A and thereafter open connection 420A, such that RDPc 220 has connected to RDPs 240N.

Server-side redirection is limited, in that the redirection information comes from the server side. For example, a server-side redirect may be limited to the particular server's namespace, ipspace, etc. A server-side redirection may be thought of as being session driven. That is, after a connection has been established, but before authentication between a client and server has occurred, the server will decide where and how to redirect a client.

Figure 4B:
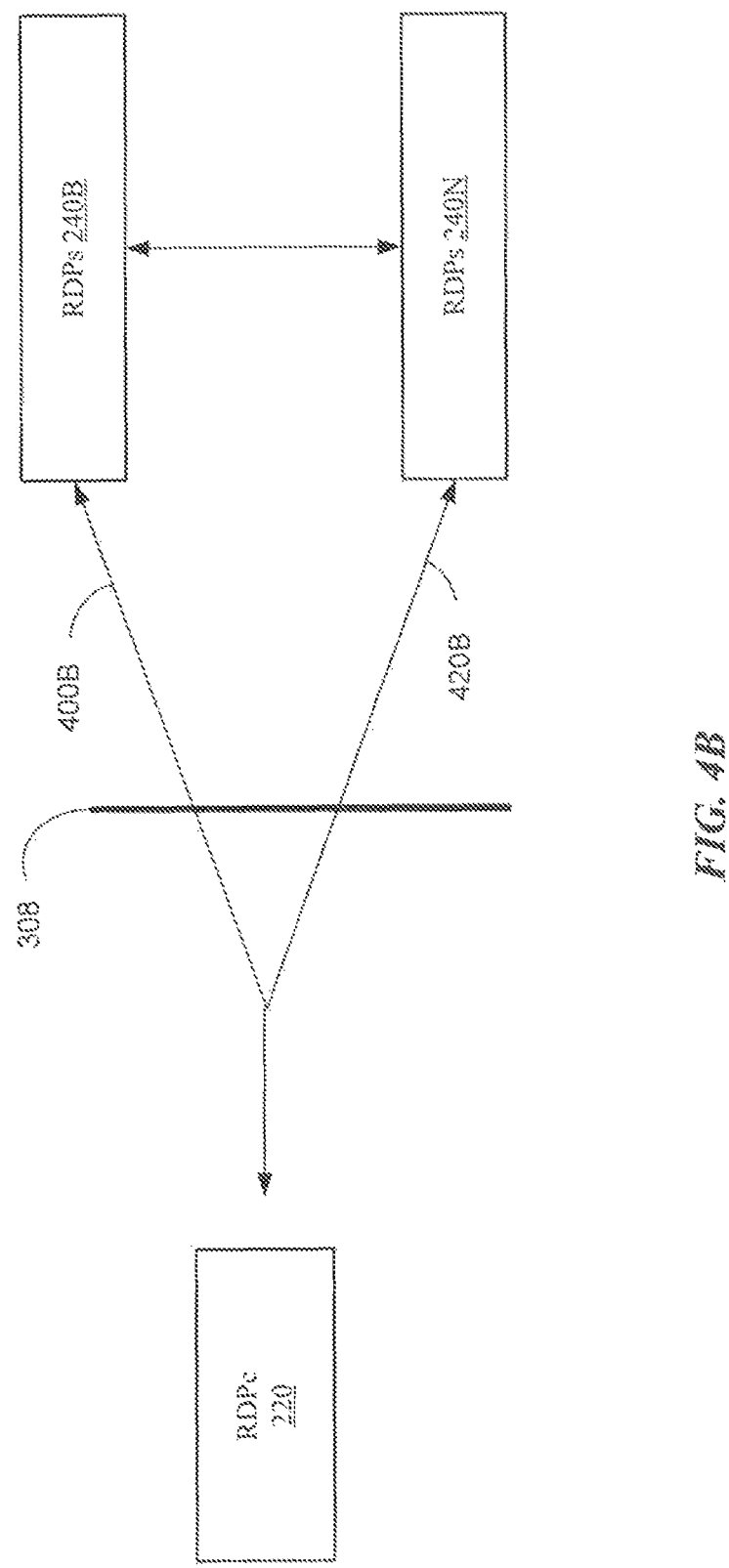
FIG. 4B illustrates an example of a client-side redirection.

FIG. 4B illustrates an example of client-side redirection within a network environment. Generally, a client-side redirection may refer to a means of causing a redirection after a connection has been established. For example, upon opening a connection between a client and a server, that is, the authentication between a client and server has taken place, at some later point in the connection a redirect may occur. The client may attempt to access something that the particular server that the client is connected to is not able to access. Therefore, in some instances, the server may request that the client go access another server. The server may pass a message to the client giving the parameters needed to access the alternate server (e.g. client namespace, ip address, etc.). Upon receiving this information, the client may then redirect itself to the alternate server, such that it may access the file that was not available on the previous server. Through client-side redirection, a client may freely and seamlessly change from server to server without any disturbance to the user, and is no longer limited to the server's namespace and ipnamespace. In particular embodiments, client-side redirection may occur within a network environment, including but not limited to, RDPc 220, one or more RDPs 240N, and firewall 308. One of ordinary skill in the art would realize client-side redirection is not limited to RDP clients and servers, but may be used between any type of client device and server.

In particular embodiments, RDP connection 400B may be formed between RDP client device 220 and RDPs 240B. In particular embodiments, connection 420B is formed between RDPc 220 and RDPs 240B after authentication has occurred. That is, connection 400A, as described in FIG. 4A, was formed before authentication has occurred. Connection 400A, described in FIG. 4A, is a pre-cursor to the protocol being established; it disallows the connections and redirects prior to the connection taking place. On the other hand, connection 400B, as illustrated in FIG. 4B, illustrates a connection occurring post connection rather then pre connection. For example, connection 400B, may represent that RDPc 220 has entered a valid username and password and connected to RDPs 240B.

In further embodiments, RDPs 240B may receive a request, to redirect RDPc 220 from RDP server 240A to RDPs 240N. As an example and not by way of limitation, RDPs 240B may receive the request from a server function of RDPs 240B. As another example and not by way of limitation, RDPs 240B may receive the request from another RDPs 240N. As yet another example and not by way of limitation, RDPs 240B may receive the request from RDPc 220.

In particular embodiments, in response to the received request, RDPs 240B may qualify RDPc 220 to be redirected to RDPs 240N based at least on information of connection 400A. In particular embodiments, if RDPc 220 is qualified to access RDPs 240N, RDPs 240B may send to RDPc 220, via a virtual channel of connection 400A, information about RDPs 240N. As an example and not by way of limitation, the information about RDPs 240N may include an indication for RDPc 220 to be redirected from RDPs 240B to RDPs 240N. Furthermore, the information may include one or more credentials (or any other suitable information) for RDPc 220 to establish connection 420B to RDPs 240N directly. As stated above, connection 420B occurs post connection, authentication of RDPc 220, and connection 400A. For example, a client-side redirection may allow a user to freely change between RDPs 240B and RDPs 240N without any interference on the RDPc 220 side.

In particular embodiments, no further input from a user of RDPc 220 may be required in order to establish connection 420B. In particular embodiments, connection 400B may be closed along with the establishment of connection 420B. Thereafter, RDPc 220 may be redirected from RDPs 240B to RDPs 240N.

In particular embodiments, the redirection may be repeated one or more times in order for RDPc 220 to access a pre-determined RDPs 240N. As an example and not by way of limitation, the redirection may be repeated one or more times in order for RDPc 220 to access a pre-determined RDPs 240N located within a different private network (for example, different enterprise network). As another example and not by way of limitation, the redirection may be repeated one or more times in order for RDPc 220 to access a pre-determined RDPs 240N of an enterprise network behind firewall 308.

A client-side redirection may be thought of as being application driven rather than session driven (as disclosed in the client-side redirection). Client-side redirection may occur multiple times within a session, that is, upon a user attempting to access an application post-connection to a server, the client itself may redirect to the applicable server without being required to enter authorization credentials multiple times. In particular embodiments, client-side redirection is a means to redirect a connection after a connection is established. Compared with the disclosed server-side redirection as disclosed in FIG. 4A. In particular embodiments, the server-side redirection may occur through a load balancer on the server side. Further, as a connection is attempted under server-side redirection, a load balancer may intervene by placing the target host's address into a connection payload before the protocol session is established. In particular embodiments, this differs from client-side redirection, in that once a connection is established to one host, the client may later be redirected by providing the pertinent connection information to the client. In further embodiments, upon providing the credentials to the client, this allows a client to disconnect and reconnect to another host all done on the side of the client. In further embodiments, the client-side redirection may enable a validation host to assure that a connection may be allowed, and then may provide a client with a means of making a connection. In particular embodiments, all of these steps may occur without the user of the client device being aware of the additional connection (or multiple connections). In further embodiments, a client-side redirection may provide an alternate means of providing credential and other secure information to a client. That is, it may be transported to a client without the risk of exposure. Additionally, in further embodiments, the same protocol may be used for all connections using the disclosed client-side redirection method. In particular embodiments, client-side redirection may be distinct from server-side in that the connection one host may be defined by another host simply be sending information to the client in a specialized form. That is, the idea of providing a tunnel back to the client to redefine a connection does not occur within the server-side redirection.

Although the disclosure describes and illustrates particular client-side redirection utilizing particular RDP client and particular RDP servers in a particular manner, the disclosure contemplates any suitable client-side redirection utilizing any suitable combination of one or more suitable RDP clients and one or more suitable RDP servers in any suitable manner.

Figure 4C:
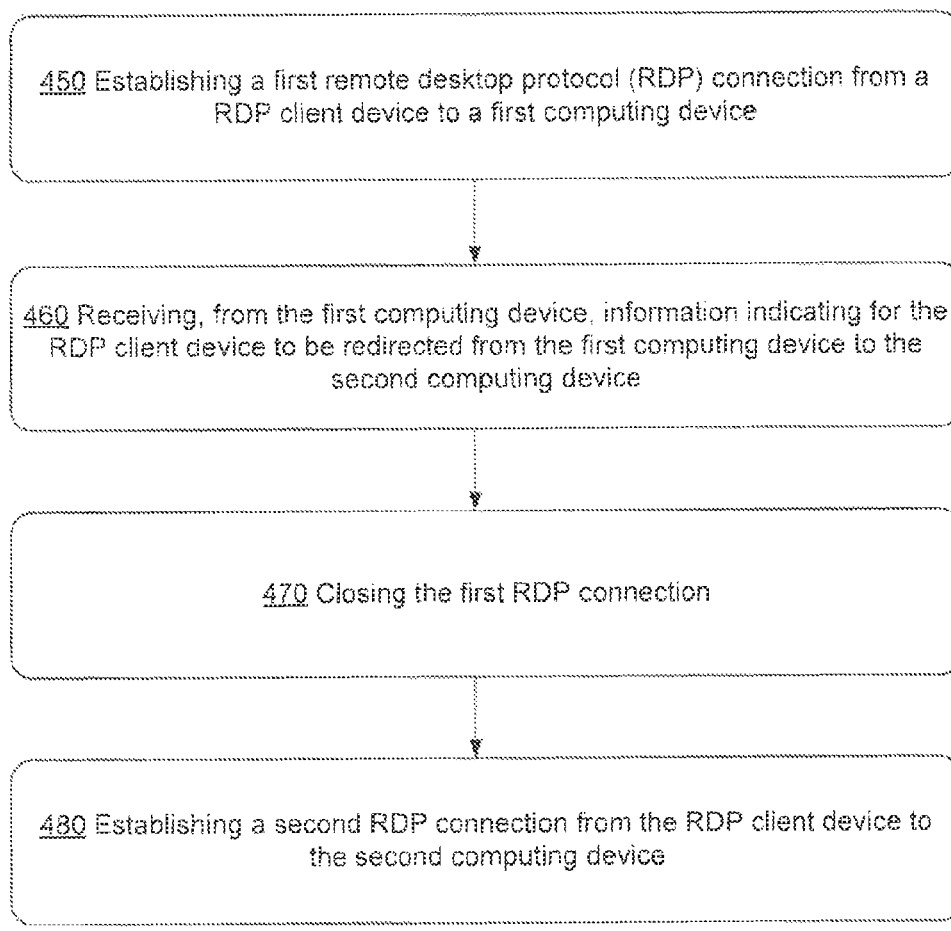
FIG. 4C illustrates an exemplary method for client-side redirection from the point of view of the client.

FIG. 4C illustrates an exemplary method for client-side redirection from the perspective of the client. In particular embodiments, the method may begin at step 450 of FIG. 4C, where a first RDP connection is established between a client device and a computing device. In particular embodiments, and as an example, a first RDP connection may refer to connection 400B as described in detail with reference to FIG. 4B. That is, RDPc 220 may establish connection 400B and authenticate with RDPs 240B. In further embodiments, the first RDP connection may comprise one or more virtual channels between RDPc 220 and the first computing device.

At step 460 of FIG. 4C, the first computing device may receive information associated with a second computing device. In particular embodiments, the information received from the second computing device to the first computing device may be received by a virtual channel of the first RDP connection. In further embodiments, the information received by the first computing device may indicate that the RDP client is to be redirected from the first computing device to the second computing device. By way of example, such instruction may be received when RDP client attempts to access information that is not accessible by the first computing device.

At step 470 of FIG. 4C, the connection between RDP client and the first computing device is closed. In particular embodiments, and as an example, connection 400B may be torn down between RDPc 220 and RDPs 240B upon RDPc 220 receiving the instructions to connect to a second computing device. Upon closing connection 400B, at step 480 of FIG. 4C, a second RDP connection is established. For example, after closing connection 400B, RDPc 220 may establish a new connection (for example, connection 420B as disclosed in FIG. 4B) between the RDP client and the second computing device. In particular embodiments, the establishment of the second connection is seamless. That is, the RDP client is not required to enter any login or credential information because the client has previously entered this information with respect to the first connection. Therefore, a RDP client may freely access any application or file that is not on a particular RDP server; the RDP client will simply perform a client-side redirection and connect to a different RDP server in order to open or access the said application or file.

FIG. 4D illustrates an exemplary method for client-side redirection from the point of view of the server. At step 402, a request may be received by an operating system (OS) of a first computing device that may cause RDPc 220, coupled to the first coupled to the first computing device, to connect to a second computing device. Furthermore, RDPc 220 may be coupled to the first computing device via connection 400B, as described in FIG. 4A. For example, an OS of RDPs 240B (i.e., the first computing device) may receive a request which causes RDPc 220 to connect to RDPs 240N over connection 420B. At step 404, the OS of the first computing device may qualify RDPc 220 to connect to the second computing device. As an example and not by way of limitation, the OS of RDPs 240B may qualify RDPc 220 to connect to RDPs 240N. In particular embodiments, qualifying RDPc 220 may include validating RDPc 220 to ensure RDPc 220 is permitted to connect to the second computing device. In further embodiments, qualifying RDPc 220 may include allowing RDPc 220 to access RDPs 240N for a pre-determined period of time. For example, RDPc 220 may gain access to the second computing device for 5 seconds before redirecting to a third computing device. In particular embodiments, qualifying RDPc 220 may include a plurality of connection tests being performed at the first computing device, where the connections tests comprise RDPc 220 and the second computing device.

At step 406, if RDPc 220 is qualified to connect to the second computing device, the OS of the first computing device may to RDPc 220 over connection 400B an instruction for RDPc 220 to be redirected from the first computing device to the second computing device. In further embodiments, the OS of the first computing device may send RDPc 220 on or more tokens or credentials for RDPc 220 to use in establishing connection 420B with the second computing device. In particular embodiments, the instructions and the credentials may be sent to RDPc 220 via a virtual channel of the first RDP connection. In particular embodiments, the second RDP connection may allow RDPc 220 to access the second computing device upon providing valid credentials. In particular embodiments, establishing the second RDP connection between RDPc 220 and the second computing device may not involve a user of RDPc 220. For example, the user of RDPc 220 may not need to enter any information to RDPc 220 for establishing the second RDP connection.

Figure 5A:
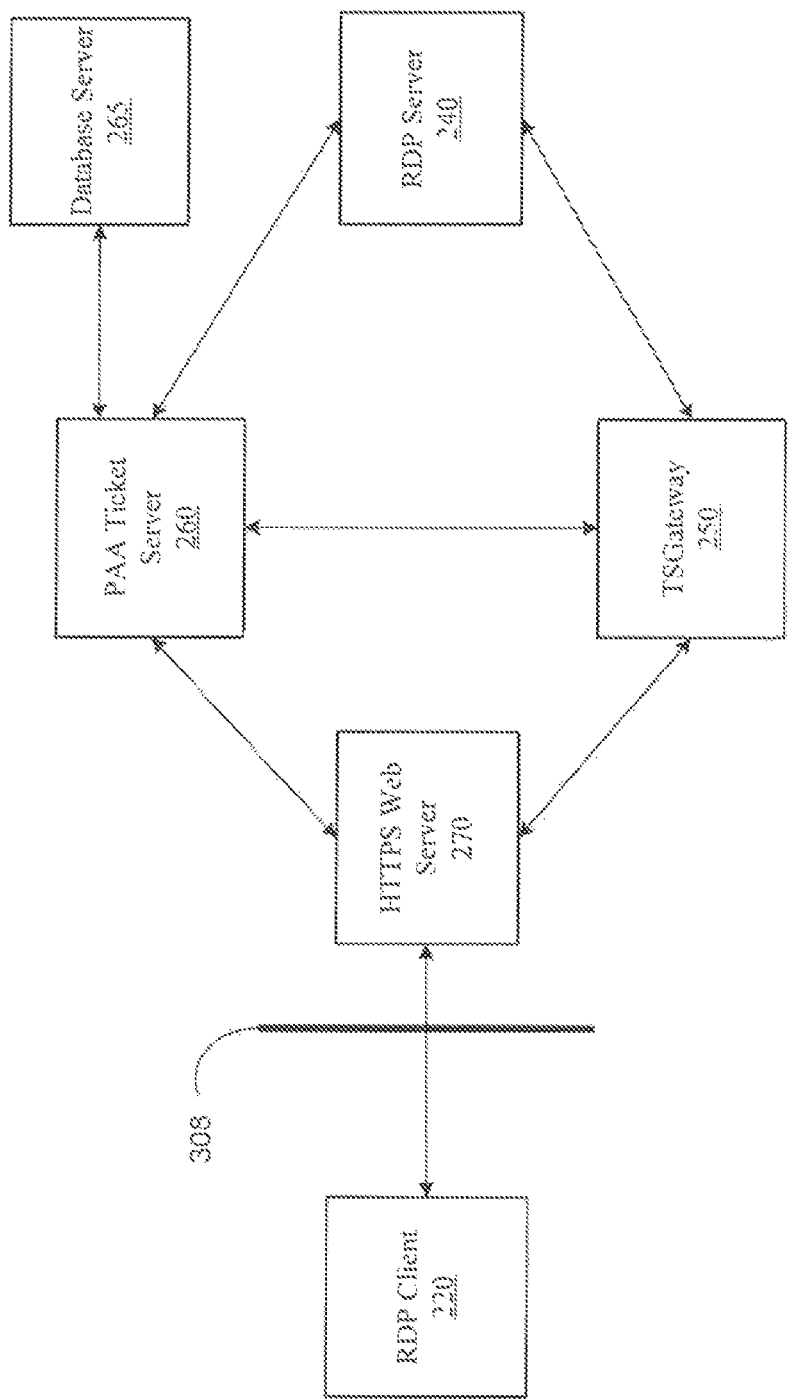
FIG. 5A is an example of a pluggable authentication and authorization framework.

FIG. 5A illustrates an example of utilizing a pluggable authentication and authorization (PAA) framework within a network environment. Generally, PAA may refer to a means to extend authorization on remote session hosts directly by use of a PAAs (Pluggable authentication and authorization server) ticketing server. In particular embodiments, PAA may serve to allow clients to authenticate and query authorization from a PAA server without worrying whether the actual authentication happens against a file or is passed on to another PAA server. Generally, a client (a web browser or other) may send an HTTP request to the service. In further embodiments, the service may then send an HTTP authentication request to PAAs which may contain the user's credentials. In further embodiments, the PAAs performs the authentication and may return the appropriate HTTP status code. The server may then send the HTTP status code to the client if the authentication has failed. Alternatively, the server may optionally check the client's host, and if the host appears to be "trusted", the authorization may succeed. If not, however, the service may send an authorization request to the PAAs, asking whether the client has permission to perform any particular action on a resource. Thereafter, the action and the resource may be described as arbitrary strings. The PAAs may then return a response code to the service indicating whether or not the authorization should succeed and the service may then return the appropriate response to client.

With reference to FIG. 5A and for purposes of illustration, utilization of a PAA framework will be described within the RDPs 240B context, however, one of ordinary skill in the art would realize the disclosed PAA framework is not limited to remote desktop servers and clients, but may be used with any type of servers, such as: File Share, NFS, Print Server, Media Streaming Server, etc. In particular embodiments, PAA utilization may be described within a network environment, including but not limited to, RDPc 220, one or more RDPs 240B, firewall 308, PAA Ticket Server (PAAs) 260, HTTP Server (web server) 270 and Terminal Services Gateway (TSG) 250.

In particular embodiments, the network environment may provide a PAA framework to authenticate and/or authorize RDPc 220 for access to one or more RDPs 240B over TSG 250. Furthermore, one or more of RDPs 240B may correspond to end-point machines of RDPc 220. In particular embodiments, the PAA framework of TSG 250 may authenticate and authorize RDPc 220 for access through TSG 250, but not through RDPs 240B. For example, particular embodiments may begin with RDPc 220 tunneling over webserver 270 to TSG 250. As an example and not by way of limitation, RDPc 220 may set up an encrypted secure shell (SSH) tunnel to a targeted TSG 250 in order to access network service provided by the targeted TSG 250. In particular embodiments, RDPc 220 may be configured to forward a pre-determined local port to a port on the targeted TSG 250. Once the encrypted SSH tunnel has been established, RDPc 220 may connect to the pre-determined local port to access the network service of the targeted TSG 250. Accordingly, the encrypted SSH tunnel may provide security to unencrypted data traffic associated with the network service. In particular embodiment, RDPc 220 may communicate with TSG 250 via a proxy server. As an example and not by way of limitation, one TSG 250 behind a firewall 308 may be the proxy server (gws) (e.g. HTTP proxy) such that RDPc 220 may connect to the proxy server in order to access network service of another server 240 that is coupled to the proxy server. In particular embodiments, upon tunneling over webserver 270, the PAA framework may allow authorization through TSG 250 and not to RDPs 240.

In particular embodiments, the PAA framework may include one or more PAAs 260 coupled to one or more TSG 250. In particular embodiments PAAs hold all the necessary information to perform an authentication routine and/or an authorization routine for RDPc 220 to access through its corresponding end-point machines. In particular embodiments, the PAA framework of TSG 250 may include one or more PAAs 260. In further embodiments, PAAs 260 may provide one or more tickets for use by RDPc 220 to access through its corresponding end-point machines. In particular embodiments, this may be referred to as a permission vector.

In particular embodiments, an authentication through the gateway occurs as an initial step. That is, the system must authenticate that the user is authorized to use the tunnel. The client, therefore, tunnels over the web server to the gateway using a ticket for authorization by the PAA ticket server. In further embodiments, the client must be authenticated by the PAA ticket server, such that the page itself may have convention within it that can pass arguments to the PAA server, which can qualify as a result of the connection taking place.

In particular embodiments, a client may tunnel through the gateway, however the authentication and/or authorization of the connection may be in concert with the particular web server to communicate to the PAA ticket server, such that, when client is authenticated to the gateway, the gateway is able to determine whether or not the client is an authorized connection. That is, this is distinct from qualifying a client based on the client's login credentials. For example, in particular embodiments the system may qualify the client with a nonce. In particular embodiments, a nonce may be employed where a system attempts to establish a secure communication. In further embodiments, the system may establish a token that is known to both sides (server and client), however any server/client/machine that rests between the client and server is not able to determine the nonce. That is, the device in the middle may not defeat the nonce. In further embodiments, the nonce may be limited in time. For example, the system cannot assume simply because it is the same user that it has the same nonce because the nonce may be limited in time from when the nonce must be used. In further embodiments, the nonce may include salt.

In particular embodiments, RDPc 220 may access webserver 270 to allow a particular user to enter login credentials. In further embodiments, webserver 270 may communicate information to PAAs 260, such that PAAs 260 may communicate with TSG 250 at the appropriate time in order to validate the particular user. In further embodiments, connection between webserver 270 and PAAs 260 and the connection between webserver 270 and TSG 250 may be considered independent session events. For example, a user may login to webserver 270 to attempt to login, which causes the submitted information to be sent to PAAs 260 as result of entering or submitting the user's credentials. In particular embodiments, the information sent to PAAs 260 from webserver 270 remains on PAAs 260 for a limited period of time. At which point, the client may attempt to connect to TSG 250 to attempt to reach a remote host (e.g. RDPs 240). In further embodiments, upon requesting access through TSG 250, the request must be validated. Such request may be validated by PAAs 260. In particular embodiments, a user will not be able to validate, in which case the user will not be permitted to pass through firewall 308. In particular embodiments, a user will be permitted access, in which case the user is permitted to enter to RDPs 240.

As described above, with reference to FIG. 5A, RDPc 220 attempts to connect RDPs 240. In order to connect to RDPs 240, RDPc 220 attempts login at webserver 270. Upon attempting login at webserver 270, the entered information may be sent to PAAs 260. In particular embodiments, acting in concert, TSG 250 must then validate the particular client with the particular nonce and determine whether or not to allow RDPc 220 to pass through. Assuming permission has been granted to allow RDPc 220 to pass, this allows RDPc 220 to pass through TSG 250, however RDPc 220 must additionally authenticate with RDPs 240. Therefore, in particular embodiments, RDPc 220 may be required to have the same authentication methods validated a second time.

In particular embodiments, upon RDPc 220 entering valid credentials to pass through TSG 250 to reach RDPs 240, user of RDPc 220 may be required to enter valid login credentials a second time at RDPs 240. In further embodiments, RDPc 220 may reuse the same ticket at the target host, RDPs 240, such that RDPs 240 may communicate to with PAAs 260 to validate authentication, and RDPc 220 is no longer required to enter valid login credentials a second time upon reaching RDPs 240.

In further embodiments, database server 265 may be employed within PAA framework. Database server 265 may be any type of server, however for purposes of illustration, database server 265 may be a SQL server. In particular embodiments, the SQL server may interact with PAAs 260. In particular embodiments, an SQL server may store all of the access permission generated by PAAs 260. In further embodiments, database server 265 may be involved in the step of generating and/or maintaining the vectoring mechanism. Allowing interaction between database server 265 and PAAs 260 may create a more secure database than without database server 265. In further embodiments, PAAs 260 may use database server 265 for persistent storage of all the tokens contained in the permission vectors. For example and not by way of limitation, when a token is generated by PAAs 260, the token may be stored in database server 265. In further embodiments, database server 265 may store tokens for multiple clients or RDPc 220. In particular embodiments, storing tokens on database server 265 may aid a system with security, verification, expiration rates, or any other type of security measure for verifying and storing tokens. In further embodiments, employing a query mechanism may make database server 265 or PAAs 260 more relevant.

In particular embodiments, a first session and second session may be employed within the PAA framework. As an example and not by way of limitation, a first session may be used to allow authentication on the gateway side within the PAA framework. In particular embodiments, the first session handles the interaction of webserver 270 and PAAs 260.

Figure 5B:
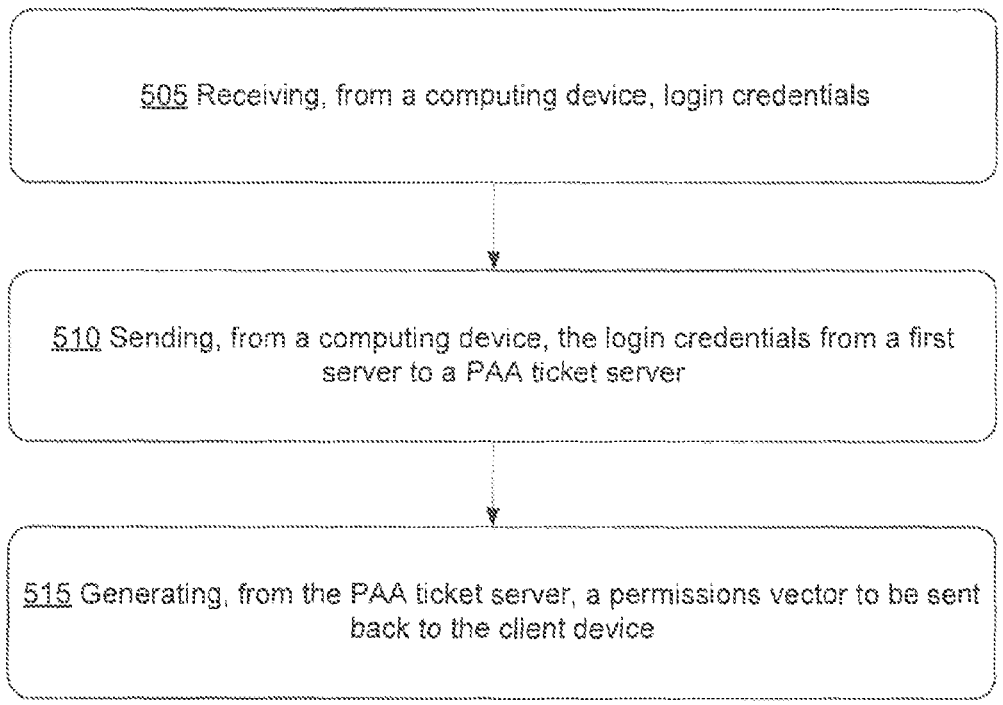
FIG. 5B illustrates an exemplary method of a first session within a pluggable authentication and authorization framework.

In particular embodiments, the first session may be exemplified with reference to FIG. 5B. In particular embodiments, the first session may begin at step 505, where the RDPc may enter any sort of credentials to webserver 270 in order to gain access to TSG 250. At step 510, upon entering credentials with webserver 270, webserver 270 passes the entered credentials to PAAs 260 where PAAs 260, at step 515, PAA 260 may return the one or more tokens to RDPc 220. In particular embodiments, PAAs 260 may return a permission vector to RDPc 220. In further embodiments, the permission vector may contain at least one token and any other sort of information. In further embodiments, PAAs 260 may provide one or more tokens for us by RDPc 220 to access through its corresponding end-point machines. As an example and not by way of limitation, one or more of the tokens may qualify RDPc 220 for access through TSG 250 may be re-used by one or more RDPs 240 to qualify an access or RDPc 220. As another example and not by way of limitation, one or more of the tokens stored within the permission vector that may qualify RDPc 220 for access through TSG 250 may be extended to include one or more additional credentials to allow on or more RDPs 240 to qualify access of RDPc 220. As such, the PAA framework may provide one or more tokens within the permission vector to enable one or more RDPs 240 connections between RDPc 220.

Figure 5C:
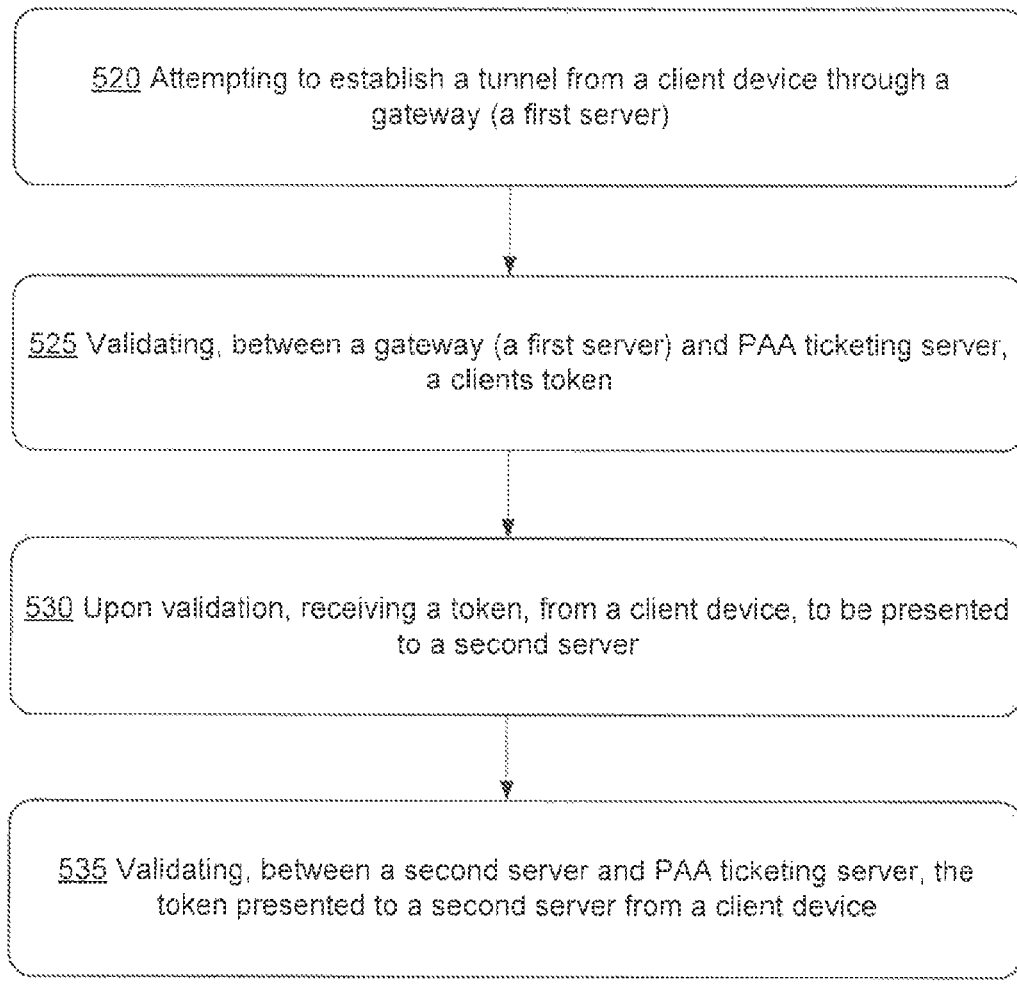
FIG. 5C illustrates an exemplary method of a second session within a pluggable authentication and authorization framework.

In further embodiments, a second session may be exemplified with reference to FIG. 5C. In particular embodiments, the second session may begin at step 520, where RDPc 220 attempts to tunnel through firewall 308, webserver 270, and TSG 250. In particular embodiments, RDPc 220 may use the token provided by PAAs 260 passed in the permission vector. If RDPc 220 contains a valid token to establish a tunnel through TSG 250, upon passing through firewall 308, RDPc 220 may be able to access any other devices once allowed through firewall 308. At step 525, TSG 250 may communicate with PAAs 260 to determine whether or not RDPc 220 has provided valid credentials based on the token RDPc 220 has supplied TSG 250. At step 530, upon validating RDPc 220 through TSG 250, RDPc 220 may then attempt to connect to RDPs 240 using the token provided to RDPc 220 by PAAs 260. At step 535, RDPs 240 may present the token provided by RDPc 220 to determine whether or not to allow the connection. In particular embodiments, RDPs may leverage GINA modified to interface with PAAs 260. In particular embodiments, GINA may refer to graphical identification and authentication. GINA may provide secure authentication and interactive logon services between RDPs 240 and PAAs 260, such that RDPc 220 is not required to enter credentials for a second time.

In further embodiments, the ticket server may preserve state. A state is a description of the status of a system that is waiting to execute a transition. A transition is a set of actions to be executed when a conditional is fulfilled or when an event is received, for example, a client and a server establishing a first or second connection. In further embodiments, it is also possible to associate actions with a state, that is, entry action (performed when entering the state) and exit state (performed when exiting the state). In particular embodiments, the client and server connection is just a connection, however, the connection may be part of a much larger set of events. For example, a client may connect to a first host, then at a later time, disconnect and be redirected to a second host, and so on. Each time the client attempts to connect to a different connection or host, a state may become dated and therefore need to be refreshed, whereby the entire process may be repeated at some level. For example, a client may connect to a server as Guest. At a later point in time, Guest may later connect to a different server as George. Upon connecting as George, the ticket server may validate the state. To validate state the server may determine whether the client first connected as Guest and received his George login. If it is not determined this happened, then the server will not permit the connection. Alternatively, the server may force the connect as Guest and then start the process ago.

In further embodiments, systems have relationships to events that occur before beforehand. In particular embodiments, when the events occur, the state may be altered and different machines may be chosen. For example, a machine may have various steps (or states) based on the current state and requirements to move to another state. For example, in order to move to another state a user may be required to enter valid login credentials to connect to a different connection. Systems that track this type of state are normally contained within a real machine and not propagated across many machines. In particular embodiments, the ticketing server preserves states, however, the system may treat the connections (for example, the connection between a client and a server) as a state and continue a flow of a machine by use of connection rules. For example, if the state is "Login as Guest" and the connection is later dropped, the state for the user that was dropped remains "Login as Guest." In further embodiments, after logging in as "Guest" and at a later point in time, an attempt is made to utilize another machine as "George," then the state may be checked in order to confirm that this is the correct next step.

In particular embodiments, a web-based operation may be considered "state-less." In further embodiments, the web-based operation may require an alternate means to order events. That is, if the ticket server may function acts to preserve state, the system is able to maintain operations for stateless clubs, but with a set of states desired for operation.

In further embodiments, an application may communicate with the ticket server, by which the application and the ticket server may exchange information. In particular embodiments, the ticket server and the application may exchange the permission vector. In particular embodiments, the application may be thought of as a method-proxy that interfaces with the ticket server. In particular embodiments, after obtaining the permission vector from the ticket server, the application may run and confirm any required credentials. In further embodiments, if the method proxy or application is not equipped to perform the task indicated, then the proxy or application may execute an application and return the results of the executed task as necessary to the ticket server. In further embodiments, upon returning the executed results the ticket server may update the state, which the application or proxy may have determined and stored.

Figure 6A:
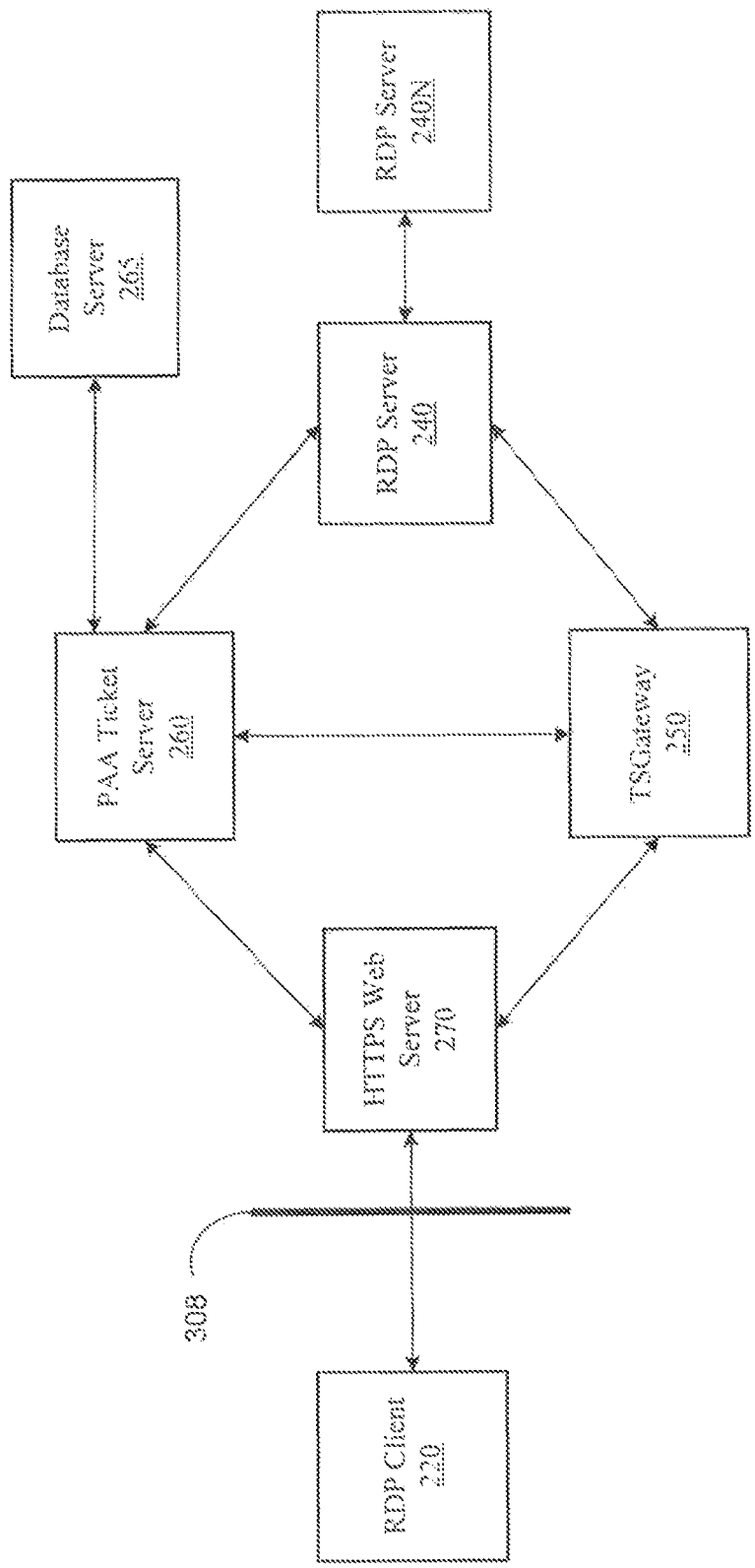
FIG. 6A illustrates an example of a client-side redirection within a pluggable authentication and authorization framework.

FIG. 6A illustrates an example of a client-side redirection within a pluggable authentication and authorization framework. Generally, client-side redirection with pluggable authentication and authorization (PAA) may refer to a means to redirect a connection after a connection is established. In particular embodiments, a target host may be determined in advance and requested entirely by a client device prior to a connection being established. In further embodiments, a client side redirect within a PAA framework may allow for one host to perform multiple different types of connection tests and once qualified, may re-direct a client to a different host, which may occur after a connection has been established. In particular embodiments, a server-side redirection within a PAA framework may occur with a network environment, including but not limited to, RDPc 220, one or more RDPs 240N, firewall 308, TSG 250, webserver 270, PAAs 260, and database server 265. One of ordinary skill in the art would realize a server-side redirection with a PAA framework is not limited to RDP clients and server, but may be used between any type of client device and server. RDP clients and servers are only used for reference and illustrative purposes.

In particular embodiments, and with reference to FIG. 6A, TSG 250 may allow RDPc 220 to utilize a tunneling protocol service of TSG 250 for tunneling over webserver 270 to TSG 250. In particular embodiments, a PAA framework to authenticate and authorize RDPc 220 for access between TSG 250 and RDPs 240 and/or RDPs 240N may be used. That is, the PAA framework may include PAAs 260 to authenticate and authorize RDPc 220 for access between TSG 250 and RDPs 240 and/or 240N. In further embodiments, PAAs 260 may be part of TSG 250 or a third-party server coupled to TSG 250. In further embodiments, PAAs 260 may provide a permission vector to RDPc 220 for access to RDPs 240 and/or 240N. In particular embodiments, the permission vector may include one or more tokens along with any other information which PAAs 260 may have access to. In particular embodiments, PAAs 260 may include encrypted credentials provided by database server 265. In particular embodiments, database server may be a SQL server, which is coupled to PAAs 260. As an example and not by way of limitation, the encrypted credentials may authorize and authenticate RDPc 220 for access to RDPs 240 and/or 240N. Although the disclosure describes and illustrates particular steps, components, devices, or systems for implementing TSGateway service and PAA framework in a particular network environment, the disclosure contemplates any suitable combinations of any suitable TSGateway and any suitable PAA framework in any suitable network environment.

In particular embodiments, PAAs 260 may be responsible for the client-side redirection information. In particular embodiments, PAAs 260 may generate and return a permission vector to RDPc 220 upon tunneling through TSG 250. In further embodiments, the permission vector may contain token for RDPc 220 as well as redirection methods. That is, FIG. 6 may display, along with other embodiments, a client-side redirection as a result of PAAs 260 acting as the sever mechanism for the client-side redirection. In further embodiments, PAAs 260 is capable of authenticating and authorizing RDPc 220, such that RDPc may be authenticated by any server RDPc attempts to connect to with the permission vector generated by PAAs 260. In further embodiments, PAAs 260 may also interact with a client-side redirection for RDPc 220. For example, RDPc 220 may attempt to connect to a remote host, however for some reason the remote host is down. At this point, RDPc 220 will attempt to redirect to another remote host. However, the PAAs 260 will be included in determining the redirection. In further embodiments, database server 265 may store tokens, redirection information, and other pertinent material for PAAs 260.

In particular embodiments, the network environment of FIG. 6A has extended pluggable authentication and authorization not simply through a TSGateway, but for providing complete session permission information for servers within a firewall. That is, with the extension of pluggable authentication and authorization there exists a declared management mechanism which could be extended to multiple other environments—it is not required to be necessary limited to use in strictly connecting to a remote host.

In particular embodiments, the permission vector generated by PAAs 260 and sent to RDPc 220 may include specific client-side redirection information. In particular embodiments, the permission vector may include of a list of servers which may be used for redirection when RDPc 220 attempts to access a remote host that may be down. For example, RDPc 220 may attempt to connect to RDPc 240, however RDPc 240 may be down for any number of reasons, at which point RDPc 220 may use the permission vector to redirect and attempt to connect to RDPc 240N. In further embodiments, RDPc 220 may search through the permission vector for potential alternate servers to connect to in multiple ways. For example, RDPc 220 may decide which server to redirect to by going through the servers in the permission vector sequentially. Alternatively, RDPc 220 may select the server that is closest in distance to RDPc 220, or any other way of sorting through a server list to decide which server to connect to.

In particular embodiments, and with reference to FIG. 6A, RDPc 220 may be redirected from RDPs 240 to RDPs 240N based on at least information provided by RDPs 240. For example, RDPc 220 may establish a first RDP connection to RDPs 240 in order to receive information from RDPs 240N. Additionally, the information may allow RDPc 220 to establish a second RDP connection to RDPs 240N. In particular embodiments, RDPs 240 may receive a request to redirect RDPc 220 from RDPs 240 to RDPs 240N. In response to the received request, RDPs 240 may qualify RDPc 220 for access to RDPs 240N based at least on credentials of RDPc 220 associated with the first RDP connection between RDPc 220 and RDPs 240. The credentials (or token) may identify RDPc 220 and allow RDPc 220 to establish the first RDP connection to RDPs 240. For example, the credentials may authorize RDPc 220 to tunnel over webserver 270 via TSG 250. In further embodiments, the credentials may form PAAs 260 to access RDPs 240 from TSG 250.

In particular embodiments, once RDPc 220 is qualified to be redirected to RDPs 240N, RDPs 240 may send information to RDPc 220 for RDPc 220 to be redirected to RDPs 240N. Additionally, the information may be sent via a virtual channel of the first RDP connection. As an example, the information may indicate to RDPc 220 for RDPc 220 to close the first RDP connection and establish a second RDP connection to RDPs 240N. In further embodiments, the information may included credentials of RDPc 220 that allows RDPc 220 to utilize TSG 250 tunneling server, obtain a permissions vector from PAAs 260, and utilize RDPs 240 in order to establish the second RDP to RDPs 240N. Thereafter, RDPc 220 may communicate with RDPs 240N via the second RDP connection, without any input from a user of RDPc 220 to establish the second RDP connection.

In particular embodiments, the client-side redirection described with reference to FIG. 6A may be performed transparently and securely without the user of RDPc 220 being aware of the redirection.

In further embodiments, and with reference to FIG. 6A, the network environment may utilize any suitable combination of one or more third-party PAAs 260 to authenticate and authorize RDPc 220 for access to RDPs 240 and/or RDPs 240N in any suitable manner. In further embodiments, RDPs 240N may be coupled directly to TSG 250 instead of to RDPs 240N. That is, the second RDP connection may be established directly between RDPc 220 and RDPs 240N over the network. In further embodiments, the information provided to RDPc 220 from RDPs 240 may allow RDPc 220 to establish one or more third RDP connections to one or more RDPs 240N. In further embodiments, client-side redirection of RDPc 220 may be repeated one or more times for RDPc 220 to get to a pre-determined RDPs 240C of the same private network as RDPs 240 or a different private network or enterprise.

In particular embodiments, client-side redirection with PAA may be used as a protocol or architecture to enable a clients ability to penetrate firewalls using a paired down third-party authentication by use of a remote host interface having the ability to redirect users after a connection is established. That is, one host is used to authenticate a user and after authentication, a client-side redirection may be used to redirect the client to a correct host. In further particular embodiments, client-side PAA may reduce end-to-end connection problems when integrated with third-party mechanisms which may provide login credentials to a remote host by use of a client-side application running with a server environment. In further embodiments, arguments may be passed through a virtual channel while maintaining an encrypted channel to the client. That is, the method may provide a client with a means of populating actual credentials (which, may be contained within a permissions vector) as required without the user needing to provide a subsequent set of credentials. In further embodiments, the network environment described in FIG. 6A may be used in smart-card, biometric, or other similar types of applications. In further embodiments, a client-side redirection with a PAA framework may simplify connections problems or issues when one or more servers or components may be involved in translating one type of information to user credentials, host locations, and applications to execute. For example, these problems may be remedied by use of a permission vector provided to a client for client-side redirections. In further embodiments, FIG. 6A may employ a means of establishing a connection by creating a function that may transcend normal functions on the client-side to launch a second connections without the user being made aware that an alternate connection may have been made. Namely, a connection is first made to a host to receive credentials (e.g., a permissions vector) for establishing a connection, however the attempted connection may be toward a closed or shut down server, in which case, the connection may be re-established with new data obtained from credentialing service (e.g., PAA ticketing server), which all appears transparent on the side of the user.

Figure 6B:
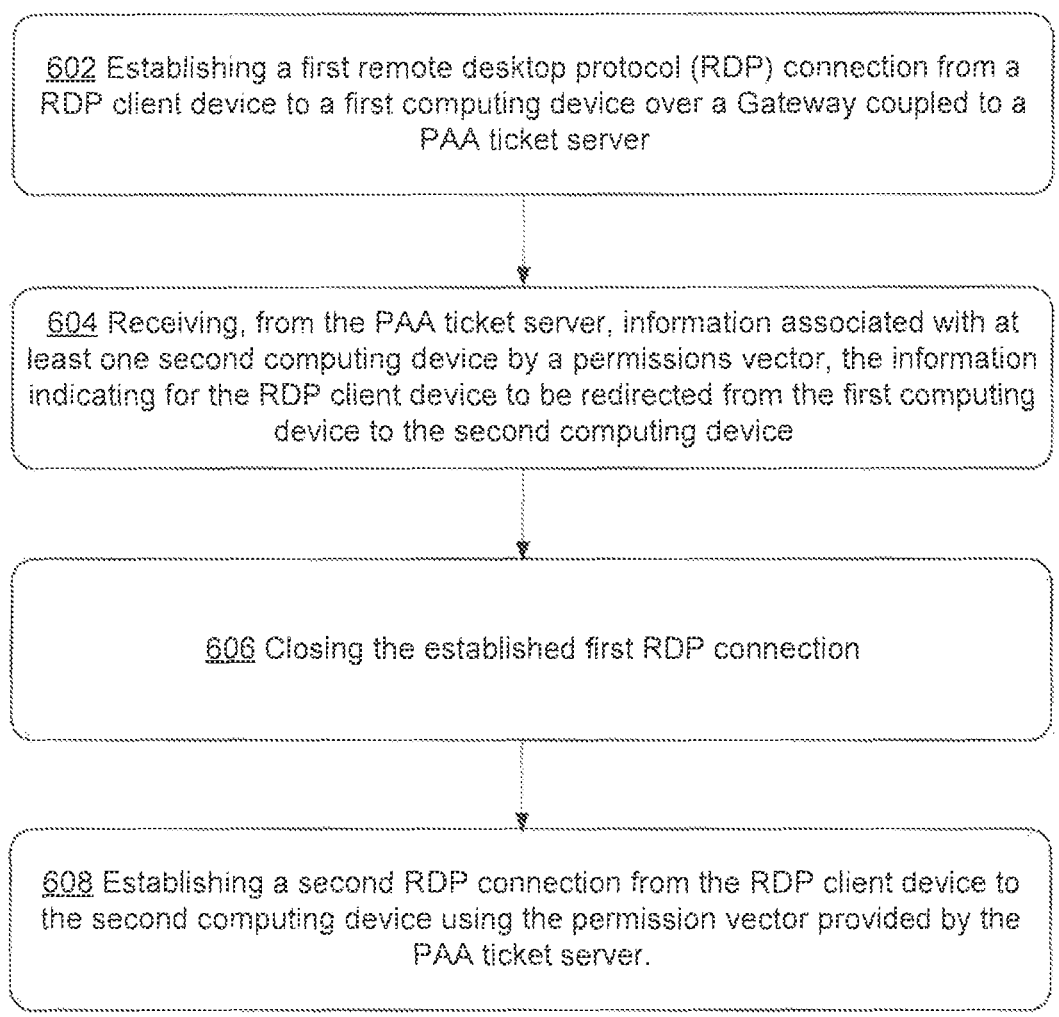
FIG. 6B illustrates an exemplary method for client-side redirection with pluggable authentication and authorization.

FIG. 6B illustrates an exemplary method for client-side redirection within a pluggable authentication and authorization framework. In particular embodiments, the method of FIG. 6B may begin at step 602 where a first RDP connection may be established from RDPc 220 to first computing device over TSG 250. In further embodiments, TSG 250 may be coupled to PAAs 260. In further embodiments, PAAs 260 may authorize RDPc 220 to connect to a first computing device. At step 604 of FIG. 6B, PAAs 260 may generate a permission vector for RDPc 220. In particular embodiments, PAAs 260 may also send the information to database server 265 for storage. In particular embodiments, the permission vector generated by RDPc 220 may contain one or more tokens along with other relevant information. In particular embodiments, the permission vector may contain a list of servers (i.e., contain information associated with at least one second computing device) to allow RDPc 220 to redirect to a second computing device. At step 606, the first connection between RDPc 220 and RDPs 240 is closed. At step 608, RDPc 220 establishes a second RDP connection from RDPc 220 to the second computing device (e.g., RDPs 240N in FIG. 6A). In further embodiments, RDPc 220 redirects to RDPs 240N using PAAs and credentials supplied by RDPs 240 in the PAA framework. In further embodiments, RDPc 220 redirects to RDPs 240N using the information provided in the permission vector generated by PAAs 250.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by an operating system (OS) of a first computing device:
   receiving a request to cause a remote desktop protocol (RDP) client device to connect to a second computing device, the RDP client device being coupled to the first computing device via a first RDP connection;
   creating an RDP virtual channel over the first RDP connection;
   permitting the RDP client device to establish a tunnel and a channel using specialized gateway service attachment through the RDP virtual channel to the second computing device, wherein the tunnel is an encrypted secure shell tunnel;
   qualifying the RDP client device to connect to the second computing device based at least on information associated with the first RDP connection, wherein qualifying the RDP client device comprises checking a permissions vector, wherein the permissions vector is provided to the RDP client device from a PAA ticketing server; and if the RDP client device is qualified to connect to the second computing device, then sending to the RDP client device:
- an instruction for the RDP client device to be re-directed from the first computing device to the second computing device;
- an instruction for the RDP client device to close the first RDP connection; and
- one or more credentials for the RDP client device to establish a second RDP connection to the second computing device, wherein the instruction and the credentials are being sent to the RDP client device via the RDP virtual channel and the tunnel created over the first RDP connection, wherein the RDP virtual channel is used to create a virtual private network between the RDP client device and one or more servers by attaching one or more gateway functions to each end of the RDP virtual channel, wherein the second RDP connection allows the RDP client device to access the second computing device, wherein each of the first and second RDP connections comprises a gateway, and wherein the credentials being sent to the RDP client device allow the RDP client device to access the second computing device from the gateway based at least on a pluggable authentication and authorization framework.

2. The method of claim 1, wherein qualifying the RDP client device comprises allowing the RDP client device to access an RDP server for a pre-determined period of time.

3. The method of claim 1, wherein establishing the second RDP connection between the RDP client device and the second computing device does not involve a user of the RDP client device.

4. The method of claim 1, wherein the credentials being sent to the RDP client device allow the RDP client device to access the gateway.

5. The method of claim 1, wherein the second RDP connection comprises a third computing device.

6. The method of claim 5, wherein the credentials being sent to the RDP client device allow the RDP client device to access the third computing device.

7. One or more computer-readable non-transitory storage media embodying logic that is operable when executed to:
by an operating system (OS) of a first computing device:
receiving a request to cause a remote desktop protocol (RDP) client device to connect to a second computing device, the RDP client device being coupled to the first computing device via a first RDP connection;
creating an RDP virtual channel over the first RDP connection;
permitting the RDP client device to establish a tunnel and a channel using specialized gateway service attachment through the RDP virtual channel to the second computing device, wherein the tunnel is an encrypted secure shell tunnel;
qualifying the RDP client device to connect to the second computing device based at least on information associated with the first RDP connection, wherein qualifying the RDP client device comprises checking a permissions vector, wherein the permissions vector is provided to the RDP client device from a PAA ticketing server; and if the RDP client device is qualified to connect to the second computing device, then sending to the RDP client device:
- an instruction for the RDP client device to be re-directed from the first computing device to the second computing device;
- an instruction for the RDP client device to close the first RDP connection; and
- one or more credentials for the RDP client device to establish a second RDP connection to the second computing device, wherein the instruction and the credentials are being sent to the RDP client device via the RDP virtual channel and the tunnel created over the first RDP connection, wherein the RDP virtual channel is used to create a virtual private network between the RDP client device and one or more servers by attaching one or more gateway functions to each end of the RDP virtual channel, wherein the second RDP connection allows the RDP client device to access the second computing device, wherein each of the first and second RDP connections comprises a gateway, and wherein the credentials being sent to the RDP client device allow the RDP client device to access the second computing device from the gateway based at least on a pluggable authentication and authorization framework.

8. The media of claim 7, wherein the virtual channel of the first RDP connection is encrypted.

9. The media of claim 7, wherein establishing the second RDP connection between the RDP client device and the second computing device does not involve a user of the RDP client device.

10. The media of claim 7, wherein the credentials being sent to the RDP client device allow the RDP client device to access the gateway.

11. An information handling system comprising:
one or more processors; and
a memory coupled to the processors comprising instructions executable by the processors, the processors being operable when executing the instructions to:
by an operating system (OS) of a first computing device:
receiving a request to cause a remote desktop protocol (RDP) client device to connect to a second computing device, the RDP client device being coupled to the first computing device via a first RDP connection;
creating an RDP virtual channel over the first RDP connection;
permitting the RDP client device to establish a tunnel and a channel using specialized gateway service attachment through the RDP virtual channel to the second computing device, wherein the tunnel is an encrypted secure shell tunnel;
qualifying the RDP client device to connect to the second computing device based at least on information associated with the first RDP connection, wherein qualifying the RDP client device comprises checking a permissions vector, wherein the permissions vector is provided to the RDP client device from a PAA ticketing server; and
if the RDP client device is qualified to connect to the second computing device, then sending to the RDP client device:
- an instruction for the RDP client device to be re-directed from the first computing device to the second computing device;

an instruction for the RDP client device to close the first RDP connection; and one or more credentials for the RDP client device to establish a second RDP connection to the second computing device, wherein the instruction and the credentials are being sent to the RDP client device via the RDP virtual channel and the tunnel created over the first RDP connection, wherein the RDP virtual channel is used to create a virtual private network between the RDP client device and one or more servers by attaching one or more gateway functions to each end of the RDP virtual channel, and wherein the second RDP connection allows the RDP client device to access the second computing device, wherein each of the first and second RDP connections comprises a gateway, and wherein the credentials being sent to the RDP client device allow the RDP client device to access the second computing device from the gateway based at least on a pluggable authentication and authorization framework.

12. The information handling system of claim 11, wherein establishing the second RDP connection between the RDP client device and the second computing device does not involve a user of the RDP client device.

13. The information handling system of claim 11, wherein the credentials being sent to the RDP client device allow the RDP client device to access the gateway.

\* \* \* \* \*